(12) United States Patent
Ott et al.

(10) Patent No.: US 11,471,876 B2
(45) Date of Patent: Oct. 18, 2022

(54) PIPETTING APPARATUS WITH A PIPETTE TUBE AND METHOD FOR DETECTING A LIQUID WITHIN AN INTERMEDIATE SECTION OF A PIPETTE TUBE

(71) Applicant: TECAN TRADING AG, Mannedorf (CH)

(72) Inventors: Philipp Ott, Steg (CH); Dominic Erb, Winterthur (CH)

(73) Assignee: TECAN TRADING AG, Mannedorf (CH)

( * ) Notice: Subject to any disclaimer, the term of this patent is extended or adjusted under 35 U.S.C. 154(b) by 220 days.

(21) Appl. No.: 16/954,793

(22) PCT Filed: Dec. 17, 2018

(86) PCT No.: PCT/EP2018/085109
§ 371 (c)(1),
(2) Date: Jun. 17, 2020

(87) PCT Pub. No.: WO2019/121445
PCT Pub. Date: Jun. 27, 2019

(65) Prior Publication Data
US 2021/0094028 A1    Apr. 1, 2021

(30) Foreign Application Priority Data

Dec. 22, 2017  (EP) .................................... 17210303

(51) Int. Cl.
*B01L 3/02*    (2006.01)
*G01N 35/10*    (2006.01)

(52) U.S. Cl.
CPC .......... *B01L 3/021* (2013.01); *G01N 35/1016* (2013.01); *B01L 2200/141* (2013.01);
(Continued)

(58) Field of Classification Search
None
See application file for complete search history.

(56) References Cited

U.S. PATENT DOCUMENTS 4,708,940 A * 11/1987 Yoshida ............... B04B 5/0421
422/547
5,045,286 A * 9/1991 Kitajima ............... G01F 23/245
73/304 C
(Continued)

FOREIGN PATENT DOCUMENTS

DE          9100548 U1    5/1991

OTHER PUBLICATIONS

International Search Report and Written Opinion for corresponding PCT application No. PCT/EP2018/085109, dated Jan. 18, 2019.

*Primary Examiner* — Brian R Gordon
(74) *Attorney, Agent, or Firm* — Notaro, Michalos & Zaccaria P.C.

(57) ABSTRACT

A pipetting apparatus and method capable of detecting a liquid within an intermediate section of a pipette tube of the pipetting apparatus. The intermediate section is located between an upper section of the pipette tube at which a first electrode is arranged and a lower section at which a second electrode is arranged. The first and second electrodes form a measurement capacitor and are operationally connected to an impedance measurement unit, which is adapted to detect whether liquid, such as a portion of a sample liquid or system liquid, is present within the intermediate section based on the measured impedance or change of impedance, e.g. an increase of the capacitance and/or a decrease of the resistance, of the measurement capacitor caused by a presence of the liquid within the intermediate section.

12 Claims, 4 Drawing Sheets

(52) U.S. Cl.
CPC ............ B01L 2200/143 (2013.01); B01L 2300/0645 (2013.01); B01L 2300/0663 (2013.01); B01L 2300/0681 (2013.01); G01N 2035/1025 (2013.01)

(56) References Cited

U.S. PATENT DOCUMENTS

| | | | | |
|---|---|---|---|---|
| 5,212,992 | A * | 5/1993 | Calhoun | G01F 23/268 422/922 |
| 5,304,347 | A * | 4/1994 | Mann | G01F 23/268 422/65 |
| 5,550,059 | A * | 8/1996 | Boger | G01F 23/242 422/106 |
| 5,855,851 | A * | 1/1999 | Matsubara | G01N 35/1009 141/96 |
| 6,148,666 | A * | 11/2000 | Roesicke | G01N 35/1016 73/304 C |
| 6,551,558 | B1 * | 4/2003 | Mann | G01F 23/245 422/106 |
| 8,894,949 | B2 * | 11/2014 | Inamura | G01N 35/1016 422/509 |
| 9,733,265 | B2 * | 8/2017 | Okuyama | G01N 35/1011 |
| 2001/0047692 | A1 * | 12/2001 | Lipscomb | G01N 35/1009 73/861.08 |
| 2003/0049861 | A1 | 3/2003 | Woodward | |
| 2005/0027985 | A1 | 2/2005 | Sprunk et al. | |
| 2005/0095723 | A1 | 5/2005 | DiTrolio et al. | |
| 2006/0172433 | A1 | 8/2006 | Motadel | |
| 2008/0286158 | A1 * | 11/2008 | Watanabe | G01N 35/1009 422/400 |
| 2010/0028213 | A1 * | 2/2010 | Gorka | G01N 35/1016 422/400 |
| 2011/0125050 | A1 * | 5/2011 | Bau | B82Y 30/00 205/261 |
| 2011/0223061 | A1 * | 9/2011 | Oonuma | G01N 35/1004 422/62 |
| 2011/0318845 | A1 * | 12/2011 | Kurono | G01N 35/0092 422/68.1 |
| 2012/0114526 | A1 * | 5/2012 | Watanabe | G01N 35/1009 422/63 |
| 2012/0209534 | A1 * | 8/2012 | Shahar | B01L 3/0241 702/50 |
| 2013/0136672 | A1 | 5/2013 | Blumentritt et al. | |
| 2013/0261021 | A1 * | 10/2013 | Bocchi | C12M 41/46 264/40.1 |
| 2015/0114140 | A1 | 4/2015 | Okuyama et al. | |
| 2015/0268230 | A1 * | 9/2015 | Endo | G01N 35/1011 73/290 R |
| 2016/0238626 | A1 * | 8/2016 | Bonzon | B01L 3/0275 |
| 2016/0313360 | A1 * | 10/2016 | Bouteffah-Touiki | B01L 13/02 |
| 2016/0313362 | A1 * | 10/2016 | Sugiyama | G01N 35/00722 |
| 2016/0327587 | A1 * | 11/2016 | Yasui | G01N 35/1011 |
| 2017/0108521 | A1 * | 4/2017 | Sasaki | B25J 11/00 |
| 2018/0093263 | A1 * | 4/2018 | Bonzon | G01N 15/12 |
| 2018/0243735 | A1 * | 8/2018 | Mantlo | B01L 3/021 |
| 2020/0254453 | A1 * | 8/2020 | Gray | B01L 3/502715 |
| 2020/0330976 | A1 * | 10/2020 | Wikholm | G01N 35/1016 |
| 2020/0381853 | A1 * | 12/2020 | Bonzon | G01N 35/1016 |

* cited by examiner

PIPETTING APPARATUS WITH A PIPETTE TUBE AND METHOD FOR DETECTING A LIQUID WITHIN AN INTERMEDIATE SECTION OF A PIPETTE TUBE

TECHNICAL FIELD

The present invention relates to a pipetting apparatus for aspirating and/or dispensing volumes of liquids. Such a pipetting apparatus can be part of an automated liquid handling system as commonly used in medical, pharmaceutical and chemical laboratories, where large amounts of sample liquids need to be processed quickly and reliably. The present invention especially pertains to a pipetting apparatus and method capable of detecting a liquid within an intermediate section of a pipette tube of the pipetting apparatus. This is for instance useful for monitoring the correct operation of the pipetting apparatus and to determine when e.g. sample liquid or system liquid has unintentionally spilled into a prohibited portion of the pipette tube (viz. an intermediate section thereof), thus potentially contaminating the pipetting apparatus.

BACKGROUND OF THE INVENTION

Laboratories conducting large-scale sample analysis in the medical, pharmaceutical or chemical industries require systems for rapidly and reliably handling liquid volumes. Pipetting of the sample liquids is at the core of these processes. Therefore, automated laboratory systems usually comprise one or more pipetting apparatuses operating on liquid containers situated on a worktable. One or more robots (in particular robotic arms) may be used for operating on such a worktable surface. These robots can carry liquid containers such as sample tubes or microplates. Specialized robots can also be implemented as robotic sample processors (RSP) comprising one or more pipetting apparatuses for aspirating and dispensing liquids or merely for delivering liquids. A central processor or computer usually controls these systems. The primary advantage of such a system is complete hands-free operation. Accordingly, these systems can run for hours or days at a time with no human intervention.

In order to guarantee high-quality results such an automated handling system must operate reliably and cross-contamination of the various sample liquids being processed must be avoided at all times. One problem that may occur during a pipetting operation is that overly much sample liquid is aspirated and penetrates too far into the pipette tube, e.g. spills over from the disposable tip into the attached fixed pipette tube, and causes contamination thereof. This can for instance happen when unintentionally a smaller size disposable tip having less capacity than necessary for the intended processing is attached to the pipette tube. One the other hand in a pipetting apparatus employing a system liquid for transferring pressure from a pressure generating source, such as a pump, to the pipette tube, an excessive amount of pressure may cause the system fluid to progress to far into the pipette tube, thus also causing contamination thereof. Typically, such malfunctions are avoided by stringent monitoring of the pressure applied to the pipette tube during aspiration and dispensation. However, pressure monitoring alone is often not sufficiently reliable to guarantee proper functioning of the pipetting apparatus. In order to avoid spillage of liquids into portions of the pipette tube where this is not allowed, porous filters are often arranged within the canal of the pipette tube. These act as a barrier and soak up any spilled liquid. However, the filter can only absorb a limited amount of liquid and will no longer be able to hold back additional liquid when it is fully soaked. Wetting of the filter is commonly detected by means of a pressure sensor, because the flow resistance caused by the filter will increase when the filter is wetted by or soaked with a liquid. Such pressure monitoring is quite complex and requires a costly pressure sensor.

Hence, there exists a need for improved means for ensuring that liquids do not spill into unwanted sections of the pipette tube, thus safeguarding high-quality results of automated liquid handling processes.

SUMMARY OF THE INVENTION

It is an object of the present invention to provide an improved pipetting apparatus capable of detecting a liquid within an intermediate section of a pipette tube of the pipetting apparatus.

Moreover, it is a further goal of the present invention to provide an improved automated liquid handling system capable of operating reliably and enabled to detect possible contaminations, thus ensuring high-quality results.

Furthermore, it is also an object of the present invention to provide a method of detecting a liquid within an intermediate section of a pipette tube of the pipetting apparatus, such that possible contamination of the pipette tube can really and reliably be determined at a low cost.

Moreover, it is a further goal of the present invention to provide a method for reliably operating a pipetting apparatus or an automated liquid handling such that possible contaminations are rapidly detected and immediately contained, thus ensuring high-quality results.

The present invention provides a pipetting apparatus comprising a pipette tube with an upper section, a lower section and an intermediate section, the intermediate section being located between the upper section and the lower section, the upper section having an upper opening at an upper end of the pipette tube for being operationally connected to a pressure generating source, such as a pump, and the lower section having a lower opening at a lower end of the pipette tube for aspirating and/or dispensing a sample liquid, wherein a first electrode is arranged at the upper section and a second electrode is arranged at the lower section, the first and second electrodes forming a measurement capacitor, and wherein the first and second electrodes are operationally connected to an impedance measurement unit adapted to determine an impedance, in particular a capacitance and/or a resistance, of the measurement capacitor, and to detect whether a liquid, in particular a portion of the sample liquid or a portion of a system liquid used for transferring pressure from the pressure generating source to the pipette tube, is present within the intermediate section based on the impedance, in particular a change of the impedance, more particularly an increase of the capacitance and/or a decrease of the resistance, of the measurement capacitor caused by a presence of the liquid within the intermediate section.

In an embodiment of the pipetting apparatus the upper section is made of a conductor such as a metal, and in particular the upper section forms the first electrode.

In a further embodiment of the pipetting apparatus the first electrode is connected to a ground potential.

In a further embodiment of the pipetting apparatus at least part of the lower section forms a mounting fixture, for instance in the form of a cone, adapted to receive a pipette tip, in particular a disposable tip, and at least part of the mounting fixture forms the second electrode.

In a further embodiment of the pipetting apparatus (at least part of) the third section is electrically insulated from the first and second electrodes, in particular the third section is made of an insulator such as glass.

In a further embodiment of the pipetting apparatus the first and second electrodes are arranged at an outer surface of the pipette tube.

In a further embodiment of the pipetting apparatus the second electrode forms part of a further measurement capacitor, and the capacitance measurement unit is further adapted to detect whether the pipette tube, more particularly the pipette tip (attached) at the lower opening, is dipped/immersed into the sample liquid, in particular to perform capacitive level detection of the sample liquid, based on an increase of the capacitance of the further measurement capacitor.

In a further embodiment of the pipetting apparatus the measurement capacitor and the further measurement capacitor are operationally connected in parallel to the capacitance measurement unit.

In a further embodiment of the pipetting a porous filter is arranged within the intermediate section and forms at least part of a dielectric of the measurement capacitor, and the capacitance measurement unit is adapted to detect whether the filter is wetted or soaked with the liquid based on the impedance, in particular a change of the impedance, more particularly an increase of the capacitance due to an increase in permittivity of the dielectric and/or a decrease of the resistance, of the measurement capacitor caused by a presence of the liquid within the filter. The porous filter is in particular made of an electrically insulating material and is insulated from the first and second electrodes.

In a further embodiment of the pipetting apparatus a porous filter is arranged within a disposable tip attachable to the lower section, in particular at an upper end to be attached to the lower section, and forms at least part of a dielectric of the measurement capacitor, and the capacitance measurement unit is adapted to detect whether the filter is wetted or soaked with the liquid based on the impedance, in particular a change of the impedance, more particularly an increase of the capacitance due to an increase in permittivity of the dielectric and/or a decrease of the resistance, of the measurement capacitor caused by a presence of the liquid within the filter. The porous filter is in particular made of an electrically insulating material and is insulated from the first and second electrodes.

In a further embodiment of the pipetting apparatus the intermediate section and the lower section are at least partially overlapping, in particular a lower end part of the intermediate section axially extends into an upper end part of the lower section, in particular essentially along an entire length of an inner portion of the lower section.

In a further embodiment of the pipetting apparatus the capacitance measurement unit is adapted to detect whether the liquid is present within the intermediate section, more particularly whether the filter has been wetted or soaked with the liquid, based on a comparison of the measured capacitance with a reference value in particular representative of the capacitance measured when the pipette tube, more particularly the pipette tip, is dipped/immersed into the sample liquid.

Furthermore, the present invention is directed to an automated liquid handling system comprising a pipetting apparatus according to one of the above-mentioned embodiments.

In an embodiment the liquid handling system further comprises a worktable or work surface on which at least one container with the sample liquid can be arranged, the worktable being operationally connected to the capacitance measurement unit as a further electrode of the further measurement capacitor, wherein the worktable is in particular connected to a ground potential.

In a further embodiment the liquid handling system further comprises at least one robotic arm.

Furthermore, the present invention is directed to a method for detecting a liquid within an intermediate section of a pipette tube of a pipetting apparatus, the intermediate section being located between an upper section and a lower section of the pipette tube, the upper section having an upper opening at an upper end of the pipette tube for being operationally connected to a pressure generating source, and the lower section having a lower opening at a lower end of the pipette tube for aspirating and/or dispensing a sample liquid, wherein a first electrode is arranged at the upper section and a second electrode is arranged at the lower section, the first and second electrodes forming a measurement capacitor, the method comprising:
  determining an impedance, in particular a capacitance and/or a resistance, of the measurement capacitor;
  detecting whether the liquid, in particular a portion of the sample liquid or a portion of a system liquid used for transferring pressure from the pressure generating source to the pipette tube, is present within the intermediate section based on the impedance, in particular a change of the impedance, more particularly an increase of the capacitance and/or a decrease of the resistance, of the measurement capacitor caused by a presence of the liquid within the intermediate section.

In an embodiment of the method the second electrode forms part of a further measurement capacitor, and wherein the method further comprises:
  detecting whether the pipette tube, more particularly a pipette tip (attached) at the lower opening, i.e. to the lower section, is dipped/immersed into the sample liquid, in particular to perform capacitive level detection of the sample liquid, based on an increase of the capacitance of the further measurement capacitor.

In a further embodiment of the method a porous filter is arranged within the intermediate section and forms at least part of a dielectric of the measurement capacitor, and the method further comprises:
  detecting whether the filter is wetted or soaked with the liquid based on the impedance, in particular a change of the impedance, more particularly an increase of the capacitance due to an increase in permittivity of the dielectric and/or a decrease of the resistance, of the measurement capacitor caused by a presence of the liquid within the filter.

In a further embodiment of the method a porous filter is arranged within a disposable tip attached at the lower opening, i.e. to the lower section, in particular at an end to be attached to the lower section, and forms at least part of a dielectric of the measurement capacitor, and wherein the method further comprises:
  detecting whether the filter is wetted or soaked with the liquid based on the impedance, in particular a change of the impedance, more particularly an increase of the capacitance due to an increase in permittivity of the dielectric and/or a decrease of the resistance, of the measurement capacitor caused by a presence of the liquid within the filter.

In a further embodiment of the method detecting whether the liquid is present within the intermediate section, more particularly whether the filter has been wetted or soaked with the liquid, is based on a comparison of the measured capacitance with a reference value in particular representative of the capacitance measured when the pipette tube, more particularly the pipette tip, is dipped/immersed into the sample liquid.

In a further embodiment of the method the permittivity of the sample liquid and/or of the system liquid is greater than the permittivity of air, in particular at least by a factor of ten.

Furthermore, the present invention is directed to a method for operating a pipetting apparatus according to one of the above-mentioned embodiments or an automated liquid handling system according to one of the above-mentioned embodiments, comprising:

- detecting whether the liquid is present within the intermediate section, more particularly whether the filter has been wetted or soaked with the liquid according to one of the above-mentioned embodiments of the method for detecting a liquid;
- stopping an ongoing pipetting action of the pipetting apparatus when having detected that liquid is present within the intermediate section, more particularly that the filter has been wetted or soaked with the liquid, in particular by applying a control signal to the pressure generating source, which control signal then causes the pressure generating source to stop changing the pressure being applied within the pipette tube.

It is specifically pointed out that combinations of the embodiments described above can result in even further, more specific embodiments.

BRIEF DESCRIPTION OF THE DRAWINGS

The present invention is further explained below by means of non-limiting specific embodiments and with reference to the accompanying drawings, which show the following.

DETAILED DESCRIPTION OF THE INVENTION

Figure 1:
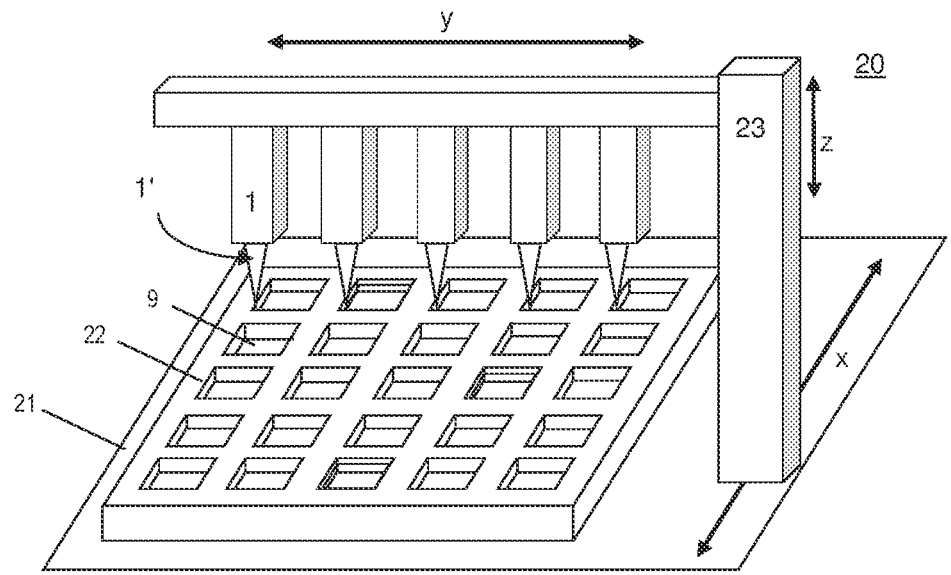
FIG. 1 an automated liquid handling system with a plurality of pipetting apparatuses.

FIG. 1 conceptually illustrates an exemplary liquid handling system 20 arranged on a worktable/work surface 21. The liquid handling system 20 comprises a motorised robotic arm 23, which can be moved in all three dimensions, i.e. in x (forward/backward), y (left/right) and z (up/down) directions controlled by a processor or computer (not shown). A plurality of (here five) pipette tubes 1 are attached to the robotic arm 23. A disposable pipette tip 1' is mounted onto each pipette tube 1. The tips 1' are moved across the worktable 21 (in x/y direction) and dipped (in z direction) into liquid contains 22, such as the wells of the depicted microplate, which are placed on the worktable 21, to aspirate and/or dispense sample liquids 9. It is important to precisely control the amount of sample liquid 9 being aspirated and/or dispensed, and especially to avoid spillage of the sample liquid 9 into the pipette tubes 1 onto which the tips 1' are mounted. Although system liquid employed to transfer pressure from e.g. a suction pump to the pipette tube 1 is often used to rinse the pipette tube 1 after processing a sample when a fixed tip is used to process a multitude of samples, it should typically be avoided to inject system liquid into the tip when disposable tips 1' are being used. The spilled liquids would contaminate either the pipette tubes 1 or the tips 1', and thus render the pipetting apparatus unusable, and/or dilute the sample liquid 9, thus likely falsifying the outcome of any subsequent analysis. Such events must be detected quickly and reliably, so that an ongoing pipetting process can be stopped immediately, and the affected pipetting apparatus be cleaned subsequently.

Figure 2:
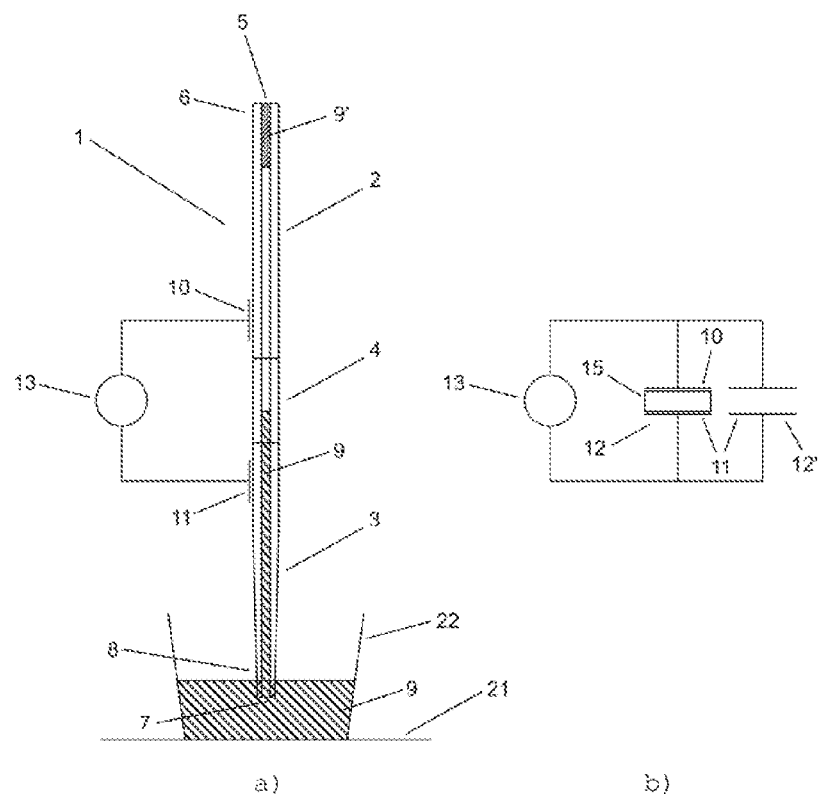
FIG. 2 a) a conceptual representation of a first embodiment of a pipetting apparatus according to the present invention, and FIG. 2 b) an equivalent circuit diagram of the first embodiment of the pipetting apparatus according to the present invention.

FIG. 2 a) shows a conceptual representation of a first embodiment of a pipetting apparatus according to the present invention. The depicted pipette tube 1 is arranged vertically in usage and comprises three sections. An upper, first section 2 with an upper opening 5 at the upper end 6 of the pipetting tube 1, to which a suction pump (not shown) is attached in order to provide pressure into the pipette tube 1, a lower, second section 3 with a lower opening 7 at the lower end 8 of the pipetting tube 1, through which sample liquid 9 contained in a liquid container 22, such as a sample tube, well or trough, placed on a worktable 21 can be aspirated and/or dispensed. An intermediate or middle, third section 4 is located between the upper and lower sections 2, 3. The upper and lower sections 2, 3 may not have the same length, so that the intermediate section 4 can be closer to either the upper or lower opening 5, 7. A first electrode 10 is arranged at the upper section 2 and a second electrode 11 is arranged at the lower section 3. In the embodiment shown in FIG. 2 a) these electrodes 10, 11 are provided at the outer surface of the pipette tube 1, which may for instance be made of glass (or another electrically insulating material). Alternatively, they may be embedded within (the wall of) the pipette tube 1. The first and second electrodes 10, 11 thus form a measurement capacitor and are connected to an impedance measurement unit 13.

An equivalent circuit diagram of this first embodiment of the pipetting apparatus is shown in FIG. 2 b), which depicts the measurement capacitor 12 with the two electrodes 10, 11 and a dielectric 15 located in between. The dielectric 15 is formed by (at least part of) the intermediate section 4 together with liquid contained therein. The capacity of the measurement capacitor 15 measured by the impedance measurement unit 13 will be dependent on the dielectric 15 and therefore will change in dependence of the amount of liquid located in the intermediate section 4, i.e. will increase as liquid enters into the intermediate section 4. In this way it can easily be determined by measuring the capacity of the measurement capacitor, whether liquid is present in the intermediate section 4. When this has been established to be the case, a controller can immediately increase the pressure in the pipette tube 1 in order to force out the spilled sample liquid 9 (at least into the lower section 3) or decrease the pressure to suck out spilled system liquid from the intermediate section 4 (at least back into the upper section 2).

Alternatively, at least part of the upper and/or lower section 2, 3 may be made of a conductor such as metal which form the first and/or second electrode 10, 11. Conductive liquid which passes into and through the intermediate section 4, and comes into contact with the electrodes 10, 11 will decrease the resistance measured by the impedance measurement unit 13. Such a decrease in resistance can therefore also indicated that liquid is present within the intermediate section 4.

Figure 3:
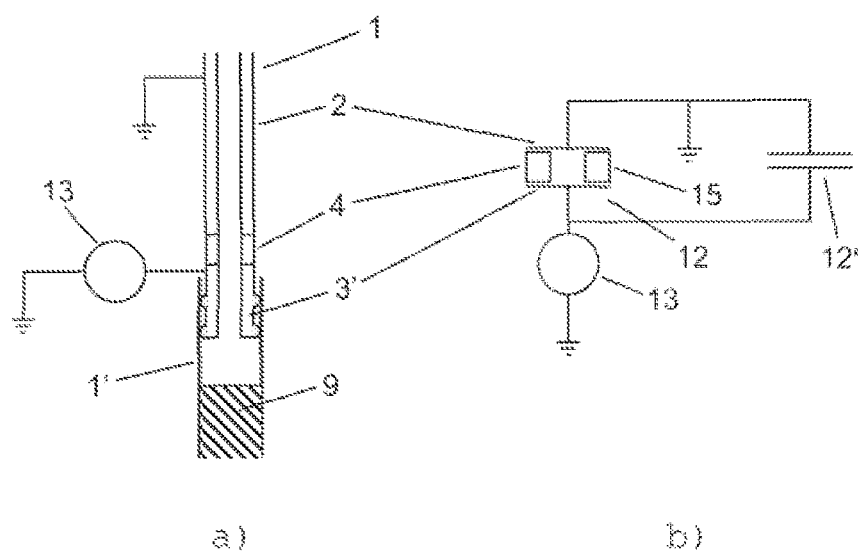
FIG. 3 a) a conceptual representation of a second embodiment of a pipetting apparatus according to the present invention with no liquid in the pipette tube, and FIG. 3 b) an equivalent circuit diagram of the second embodiment of the pipetting apparatus according to the present invention.

FIG. 3 a) shows a conceptual representation of a second embodiment of a pipetting apparatus according to the present invention. In this embodiment the upper section 2 is made of a first conductive (e.g. metal) tube forming the first electrode, which is connected to ground. The lower section is made of a metal (i.e. conductive) mounting fixture such as a cone 3' forming the second electrode, onto which a disposable tip 1' is mounted. The second electrode is directly connected to the impedance measurement unit 13, while the first electrode is indirectly connected to the impedance measurement unit 13 via ground. The intermediate section 4 is made of an electrically insulating tube, which electrically insulates the first and second electrodes from one another and thus forms part of the dielectric 15 of the measurement capacitor 12. During a normal pipetting operation the sample liquid 9 will remain in the disposable tip 1' and not come into contact with the cone 3'. The cone 3' together with the disposable tip 1' can form a further electrode of a further measurement capacitor 12', where for instance the worktable, which is e.g. attached to ground, acts as a counter-electrode. With this arrangement it is possible to detect when the disposable tip 1' is dipped/immersed into the sample liquid 9, at which point the capacity of the further measurement capacitor 12' increases abruptly due to the sample liquid 9 now becoming part of (or capacitively influencing) the further electrode. In the setup according to FIG. 3 (& FIGS. 4-6) the measurement capacitor and the further measurement capacitor are connected in parallel with the impedance measurement unit 13, therefore their capacities are added to one another. This means that the measured capacitance will make a step increase once the tip 1' touches the sample liquid 9 and then again—a much larger step increase—if sample liquid 9 enters into the intermediate section 4 of the pipette tube 1, which increases the permittivity of the dielectric 15 of the measurement capacitor 12. The capacity of the measurement capacitor thus dominates over the capacity of the further measurement capacitor 12' employed for capacitive liquid level detection (cLLD; cf. e.g. FIG. 7 first 15 seconds).

FIG. 3 b) schematically illustrates the arrangement according to the second embodiment in the form of an equivalent circuit diagram. The further measurement capacitor 12' is parallel to the measurement capacitor 12 with the impedance measurement unit 13.

Figure 4:
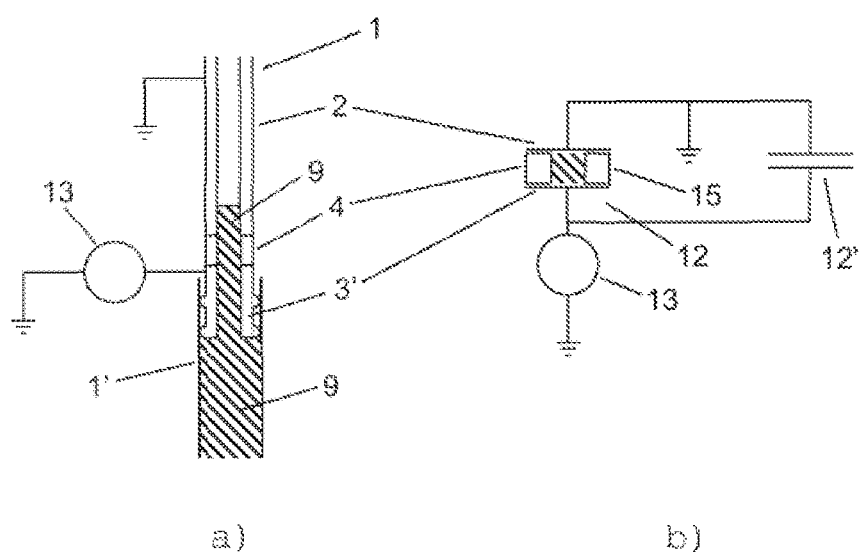
FIG. 4 a) a conceptual representation of the second embodiment of a pipetting apparatus according to the present invention with liquid in the pipette tube, and FIG. 4 b) an equivalent circuit diagram of the second embodiment of the pipetting apparatus according to the present invention with liquid in the pipette tube.

FIG. 4 a) shows the second embodiment in the situation where the sample liquid 9 spills into the pipette tube and passes through the intermediate section 4 into the upper section 2. This leads to an increase of the measured capacity of the measurement capacitor 12 for the case when the sample liquid 9 is essentially non-conductive such as e.g. deionized water or ethanol (or when the two electrodes 10, 11 are electrically insulated from the sample liquid 9). If the sample liquid 9 is conductive and both the cone 1' as well as the upper section tube are made of metal the resistance of the measurement capacitor 12 will decrease to the point of the sample liquid 9 essentially short circuiting the two electrodes. FIG. 4 b) schematically illustrates the corresponding equivalent circuit diagram (for the case of a non-conductive sample liquid, i.e. a situation where the resistance is very large, and thus no parallel resistor is shown).

Figure 5:
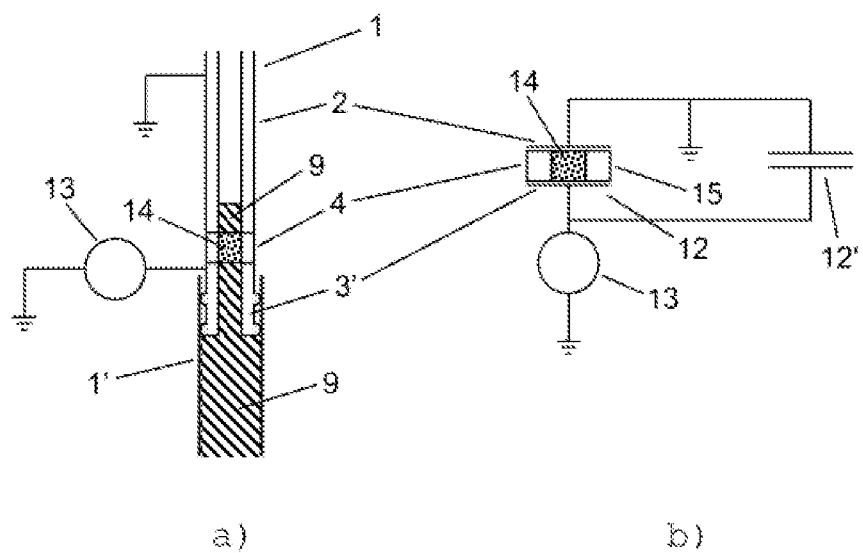
FIG. 5 a) a conceptual representation of a third embodiment of a pipetting apparatus according to the present invention with a filter in the pipette tube, and FIG. 5 b) an equivalent circuit diagram of the third embodiment of the pipetting apparatus according to the present invention.

FIG. 5 a) shows a conceptual representation of a third embodiment of a pipetting apparatus according to the present invention with a porous filter 14 within the intermediate section 4 of the pipette tube 1, i.e. inline within the canal of the pipette tube 1. When the filter 14 is wetted or soaked with sample liquid 9 (or system liquid), it will act as a barrier and resorb the liquid, and thus prevent (sample/system) liquid from passing either into the upper section 2 or the lower section 3 of the pipette tube 1 at least for a short time (until no further liquid can be soaked up by the filter 14). The filter 14 acts as part of the dielectric 15 and therefore the capacitance of the measurement capacitor 12 increases when liquid enters into the filter 14, which causes the permittivity of the dielectric 15 to become larger (because the permittivity of the liquid is greater than the permittivity of air). FIG. 5 b) schematically illustrates the corresponding equivalent circuit diagram (again for the case of a non-conductive sample liquid, i.e. a situation where the resistance is very large, and thus no parallel resistor is shown).

Figure 6:
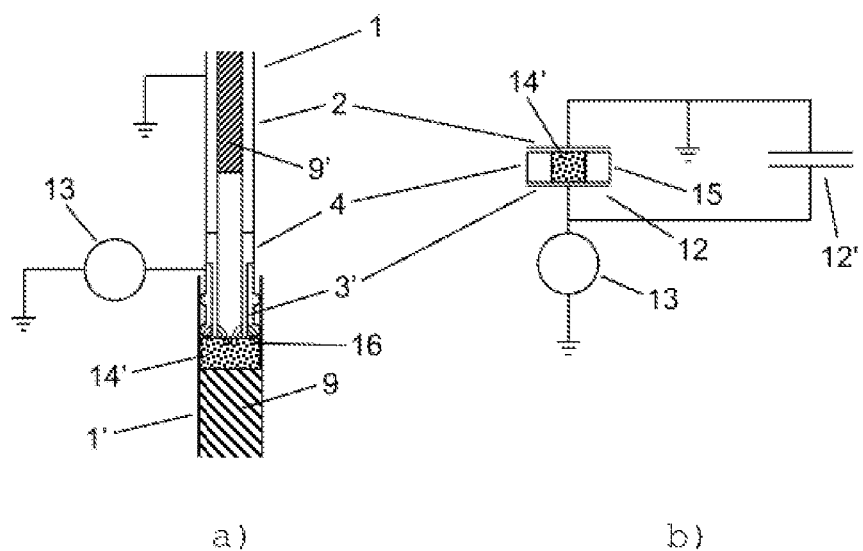
FIG. 6 a) a conceptual representation of a fourth embodiment of a pipetting apparatus according to the present invention with a filter in the disposable tip, and FIG. 6 b) an equivalent circuit diagram of the fourth embodiment of the pipetting apparatus according to the present invention.

FIG. 6 a) shows a conceptual representation of a fourth embodiment of a pipetting apparatus according to the present invention with a porous filter 14' is arranged within the disposable tip 1' mounted on the cone 3' of the pipette tube 1. In this case, the lower end part of the intermediate section 4 axially extends into the upper end part of the cone 3' along the entire length of the inner portion of the cone 3'. In this way, when the filter 14' in the tip 1' is wetted or soaked either by sample liquid 9 or by system liquid 9' the filter 14' is capacitively coupled to the intermediate section 4 by means of the electrical field 16, which results in an increase of the measurement capacitor's capacity. FIG. 6 b) schematically illustrates the corresponding equivalent circuit diagram (once again for the case of a non-conductive sample liquid, i.e. a situation where the resistance is very large, and thus no parallel resistor is shown).

Figure 7:
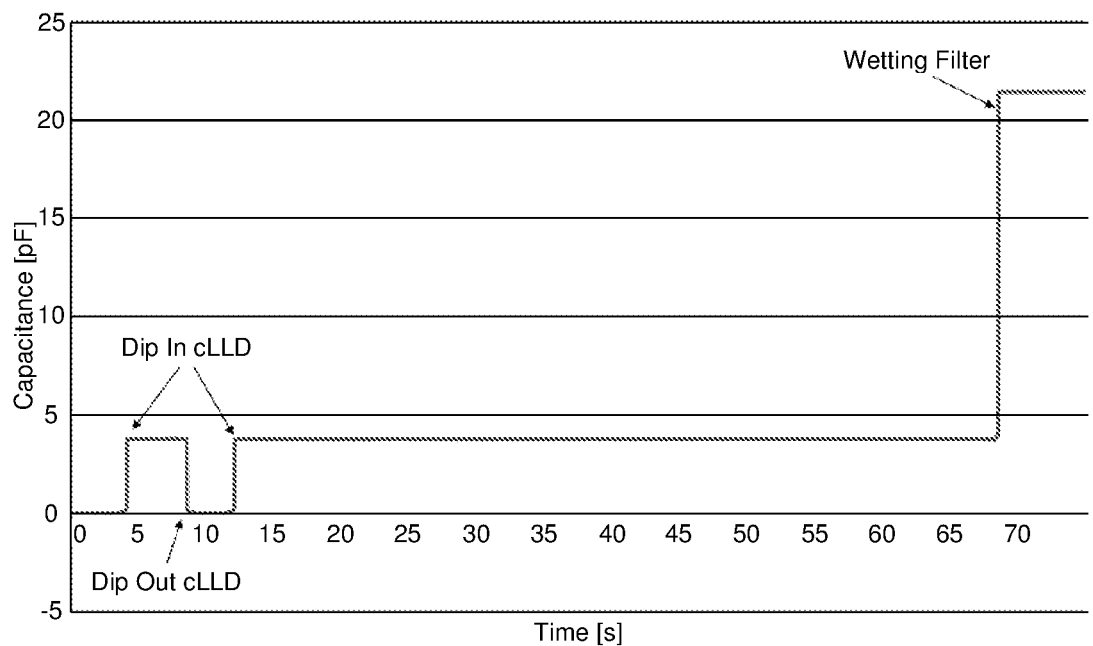
FIG. 7 an exemplary plot of the measured capacity over time for an arrangement according to the third embodiment with a filter in the pipette tube.

Finally, FIG. 7 shows an exemplary plot of the measured capacity over time for an arrangement according to the third embodiment (cf. FIG. 5) with a filter 14 in the intermediate section 4 of the pipette tube 1. After approximately 4 seconds the tip 1' is dipped into deionized water which results in an increase of the measured total capacity (=capacity of the measurement capacitor 12+capacity of the further/cLLD measurement capacitor). After 8 seconds the tip 1' is removed from the water, resulting in a decrease of the measured total capacity and after 12 seconds re-immersed again, increasing the measured total capacity once more.

After approximately 68 seconds water reaches the porous filter 14, which causes a strong increase of the total capacity due to the permittivity of the dielectric 15 of the measurement capacitor 12 becoming larger because of the sudden influx of water into the filter 14.

In summary, the present invention enables to detect the presence of (sample/system) liquid within an intermediate section 4 of a pipette tube 1. To achieve this a first electrode 10 is arranged at an upper section 2 of the pipette tube 1 (or at least part of the upper section 2 acts as the first electrode 10) and a second electrode 11 is arranged at a lower section 3 of the pipette tube 1 (or at least part of the lower section 2, e.g. the cone 3' onto which a disposable tip 1' can be mounted, acts as the second electrode 11). The intermediate section 4 and in particular a porous filter 14 arranged in the canal of the intermediate section 4 acts as a dielectric 15 of a measurement capacitor 12 formed by the two electrodes 10, 11. Any liquid wetting or soaking the filter 14 will increase the capacity of the measurement capacitor 12 due to the increased permittivity of the dielectric 15 caused by liquid within the filter 14. This increase in capacity can be easily detected by means of an impedance measurement unit 13, which can also be used to perform capacitive liquid level detection using a further measurement capacitor 12' attached to the impedance measurement unit 13 parallel to the measurement capacitor 12. The detection of liquid within the intermediate section 4 may also be based on a resistance measurement of the measurement capacitor 12 using the impedance measurement unit 13, especially when conductive liquids are to be detected.

LIST OF REFERENCE SYMBOLS

1 pipette tube
1' (disposable) pipette tip
2 upper/first section of the pipette tube
3 lower/second section of the pipette tube
3' cone (mounting fixture)
4 intermediate/middle/third section of the pipette tube
5 upper/first opening of the pipette tube
6 upper/first end of the pipette tube
7 lower/second opening of the pipette tube
8 lower/second end of the pipette tube
9 sample liquid
9' system liquid
10 first electrode
11 second electrode
12 measurement capacitor
13 impedance measurement unit
12' further measurement capacitor
14 filter within intermediate section
14' filter within (disposable) tip
15 dielectric
16 electrical field
20 liquid handling system
21 worktable/work surface
22 liquid container, e.g. a microplate with a multitude of wells
23 robotic arm
x first horizontal motion axis of the robotic arm (e.g. forward/backward)
y second horizontal motion axis of the robotic arm (e.g. left/right)
z vertical motion axis of the robotic arm (e.g. up/down)

The invention claimed is:

1. A pipetting apparatus comprising:
a pipette tube (1) with an upper section (2), a lower section (3) and an intermediate section (4), the intermediate section (4) being located between the upper section (2) and the lower section (3), the upper section (2) having an upper opening (5) adapted for operational connection to a pressure generating source, and the lower section (3) having a lower opening (7) for aspirating and/or dispensing a sample liquid (9),
wherein a porous filter (14, 14') is arranged within the intermediate section (4) or within a disposable tip (1') mounted on a cone (3') at the lower section (3), wherein a lower end part of the intermediate section (4) axially extends into an upper end part of the cone (3') along the entire length of an inner portion of the cone (3'),
wherein a first electrode (10) is arranged at the upper section (2) and a second electrode (11) is arranged at the lower section (3), the first and second electrodes (10, 11) forming a measurement capacitor (12),
wherein the filter (14, 14') forms at least part of a dielectric (15) of the measurement capacitor (12), and
wherein the pipetting apparatus comprises an impedance measurement unit (13) adapted to determine an impedance, in particular a capacitance and/or a resistance, of the measurement capacitor (12), and to detect whether the filter (14, 14') is wetted or soaked with a liquid (9, 9"), a portion of a sample liquid (9) or a portion of a system liquid (9') used for transferring pressure from the pressure generating source to the pipette tube (1), based on the impedance, a change of the impedance, an increase of the capacitance, due to an increase in permittivity of the dielectric (15), and/or a decrease of the resistance, of the measurement capacitor (12) caused by a presence of the liquid (9, 9'), the portion of the sample liquid (9) or the portion of a system liquid (9'), within the filter (14, 14'), and
wherein the first and second electrodes (10, 11) are operationally connected to the impedance measurement unit (13).

2. The pipetting apparatus of claim 1, wherein at least part of the lower section (3) forms a mounting fixture (3') adapted to receive a pipette tip (1'), a disposable tip (1'), and wherein at least part of the mounting fixture (3') forms the second electrode (11).

3. The pipetting apparatus of claim 1, wherein the second electrode (11) is part of a further measurement capacitor (12'), and wherein the capacitance measurement unit (13) is further adapted to detect whether the pipette tube (1), having a pipette tip (1') mounted at the lower opening (7), is dipped into the sample liquid (9), to perform capacitive level detection of the sample liquid (9), based on an increase of the capacitance of the further measurement capacitor (12').

4. The pipetting apparatus of claim 3, wherein the measurement capacitor (12) and the further measurement capacitor are operationally connected in parallel to the capacitance measurement unit (13).

5. The pipetting apparatus of claim 1, wherein the intermediate section (4) and the lower section (3) are at least partially overlapping, a lower end part of the intermediate section (4) axially extends into an upper end part of the lower section (3), along an entire length of an inner portion of the lower section (3).

6. The pipetting apparatus of claim 1, wherein the capacitance measurement unit (13) is adapted to detect whether the filter (14, 14') has been wetted or soaked with the liquid (9, 9') based on a comparison of the measured capacitance with a reference value in particular representative of the capacitance measured when the pipette tube (1), having a pipette tip (1') mounted thereon, is dipped into the sample liquid (9).

7. An automated liquid handling system (20) comprising a pipetting apparatus of claim 1, and
the pressure generating source operably connected to the pipette tube (1).

8. A method for detecting the presence of a liquid (9, 9") within a porous filter (14, 14') arranged within an intermediate section (4) of a pipette tube (1) of a pipetting apparatus or within a disposable tip (1') mounted on a cone (3'), which includes an upper end part, at a lower section (3) of the pipette tube (1),
wherein a lower end part of the intermediate section (4) axially extends into the upper end part of the cone (3') along the entire length of an inner portion of the cone (3'), the intermediate section (4) being located between an upper section (2) and the lower section (3) of the pipette tube (1), the upper section (2) having an upper opening (5) for being operationally connected to a pressure generating source, and the lower section (3) having a lower opening (7) for aspirating and/or dispensing a sample liquid (9),
wherein a first electrode (10) is arranged at the upper section (2) and a second electrode (11) is arranged at the lower section (3), the first and second electrodes (10, 11) forming a measurement capacitor (12), wherein the porous filter (14, 14') forms at least part of a dielectric (15) of the measurement capacitor (12), the method comprising the steps of:
determining an impedance, a capacitance and/or a resistance, of the measurement capacitor (12); and
detecting whether the filter (14, 14') is wetted or soaked with the liquid (9, 9'), a portion of the sample liquid (9) or a portion of a system liquid (9') used for transferring pressure from the pressure generating source to the pipette tube (1), based on the impedance, a change of the impedance, an increase of the capacitance, due to an increase in permittivity of the dielectric (15), and/or a decrease of the resistance, of the measurement capacitor (12) caused by a presence of the liquid (9, 9'), the portion of the sample liquid (9) or the portion of a system liquid (9'), within the intermediate section (4).

9. The method of claim 8, wherein the second electrode (11) forms part of a further measurement capacitor (12'), and wherein the method further comprises the steps of:
detecting whether the pipette tube (1), having a pipette tip (1') mounted at the lower opening (7), is dipped into the sample liquid (9), to perform capacitive level detection of the sample liquid (9), based on an increase of the capacitance of the further measurement capacitor (12').

10. The method of claim 8, wherein detecting whether the filter (14, 14') has been wetted or soaked with the liquid (9, 9') is based on a comparison of the measured capacitance with a reference value, representative of the capacitance measured when the pipette tube (1), having a pipette tip (1') mounted thereon, is dipped into the sample liquid (9).

11. A method for operating a pipetting apparatus according to claim 1, the method comprising the steps of:
detecting whether the filter (14, 14') has been wetted or soaked with the liquid (9, 9'); and
stopping an ongoing pipetting action of the pipetting apparatus when having detected that the filter (14, 14') has been wetted or soaked with the liquid (9, 9'), by applying a control signal to the pressure generating source, which control signal then causes the pressure generating source to stop changing the pressure being applied within the pipette tube (1).

12. A method for operating an automated liquid handling system (20) according to claim 7, the method comprising the steps of:
detecting whether the filter (14, 14') has been wetted or soaked with the liquid (9, 9'); and
stopping an ongoing pipetting action of the pipetting apparatus when having detected that the filter (14, 14') has been wetted or soaked with the liquid (9, 9'), by applying a control signal to the pressure generating source, which control signal then causes the pressure generating source to stop changing the pressure being applied within the pipette tube (1).

\* \* \* \* \*